United States Patent [19]

West et al.

[11] Patent Number: 4,569,366

[45] Date of Patent: Feb. 11, 1986

[54] POSITION INDICATOR FOR RISING STEM VALVE

[75] Inventors: Michael D. West, Arlington Heights; Andrew W. Channell, Mount Prospect, both of Ill.

[73] Assignee: International Telephone and Telegraph Corporation, New York, N.Y.

[21] Appl. No.: 390,185

[22] Filed: Jun. 21, 1982

[51] Int. Cl.[4] .............................................. F16K 37/00
[52] U.S. Cl. .................. 137/556.3; 137/556; 116/277
[58] Field of Search ........................... 137/556, 556.3; 116/277

[56] References Cited

U.S. PATENT DOCUMENTS

| | | | |
|---|---|---|---|
| 171,071 | 12/1875 | Wallace | 137/556 |
| 188,154 | 3/1877 | Leavitt et al. | 137/556.3 |
| 486,610 | 10/1892 | Giles | 116/277 |
| 575,848 | 1/1897 | O'Brien | 137/556 |
| 577,147 | 2/1897 | Paul | 116/277 |
| 1,195,429 | 8/1916 | Action | 137/556 |
| 1,678,409 | 7/1928 | Bowland | 116/277 |
| 1,799,143 | 4/1931 | Bailey | 137/556 |
| 2,234,052 | 3/1941 | Luenz | 137/556.3 |
| 2,239,842 | 4/1941 | Evans | 116/277 |
| 2,646,767 | 7/1953 | Hanson | 116/277 |
| 2,768,604 | 10/1956 | Enerud | 116/277 |
| 3,183,926 | 5/1965 | Boudot | 137/556.3 |
| 3,565,089 | 2/1971 | Thompson | 137/556 |

Primary Examiner—A. Michael Chambers
Attorney, Agent, or Firm—Donald J. Lenkszus

[57] ABSTRACT

A rising stem valve includes a scale plate attached to the stem and rising with the stem. A stationary reference mark on the valve bonnet indicates the degree of opening of the valve on the scale plate. The scale plate is rotatable around the valve stem to permit viewing from any position.

14 Claims, 12 Drawing Figures

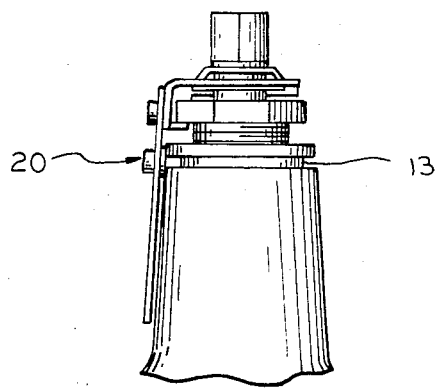
FIG.4
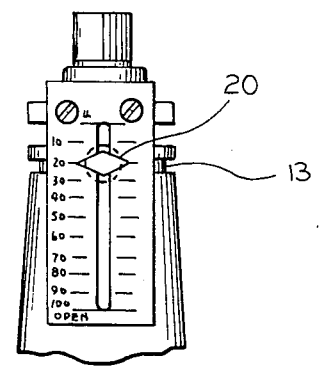
FIG.5
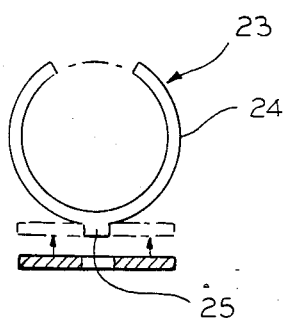
FIG.8
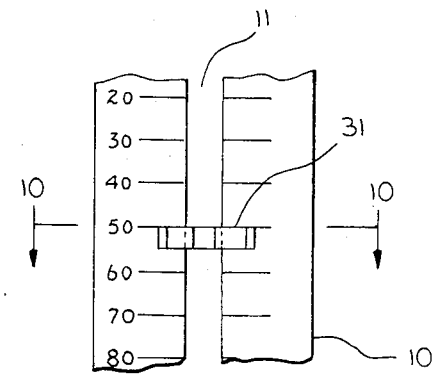
FIG.9
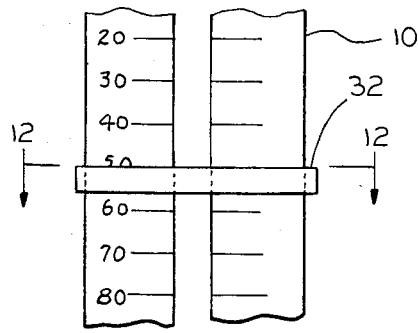
FIG.11
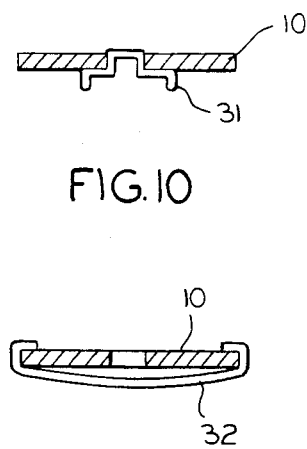
FIG.10
FIG.12

POSITION INDICATOR FOR RISING STEM VALVE

BACKGROUND OF THE INVENTION

This invention pertains to valves, in general, and to a calibrated position indicator for a rising stem valve, in particular.

Prior art rising stem globe valves include indicators to show the position of the valve disc as a percent of full open. One such valve includes a calibrated scale mounted to a valve bonnet by means of holding screws. The valve stem extends beyond the bonnet and includes an indicator groove thereon. The scale extends above the bonnet adjacent the valve stem and includes an elongated slot through which the indicator groove may be seen. Graduated markings on the scale indicate the percent opening of the valve. To calibrate the scale the holding screws are loosened and the scale is moved upward or downward.

Such a prior art arrangement requires the use of an extended shaft and scale. Additionally, the bonnet barrel must have a flat land on which to mount the scale and must be cross-drilled and tapped for the mounting screws. Further, a packing gland and nut are used between the shaft and the valve bonnet. To remove the packing gland, it is necessary to remove or bend the scale out of the way. Once the scale has been removed or bent, zero calibration of the scale is lost.

Still further, the scale is in a fixed position relative to the bonnet and accordingly, when the valve is installed in a system, the position of the scale may be such that the scale cannot be easily read.

SUMMARY OF THE INVENTION

In accordance with the principles of the invention, a rising stem valve is provided wherein the length of the valve shaft or stem is reduced; the packing gland can be replaced without losing the factory setting of the scale zero position, the scale may be read from any position around the stem, and the bonnet does not require a flat land or need to be cross drilled and tapped.

In accordance with the principles of the invention a calibrated position indicator comprises a cylindrical or partially cylindrical scale attached to the valve stem and movable therewith and a stationary reference mark carried by the valve bonnet.

As the stem is turned to change the position of the valve elements, the scale moves upward with the stem and the position of the reference mark relative to the scale indicates the valve position. The scale is rotatable relative to the shaft so that it may be moved to any position convenient for viewing.

BRIEF DESCRIPTION OF THE DRAWINGS

The invention may be better understood from a reading of the following detailed description in conjunction with the drawings in which:

FIG. 4 illustrates inside elevational view of the valve portion of FIG. 2 wherein a sliding pointer is provided;

FIG. 5 illustrates the structure of FIG. 4 with the scale plate turned 90 degrees;

FIG. 8 illustrates an alternative pointer;

FIGS. 9 and 10 illustrate a portion of the scale of the valve portion of FIG. 2 carrying a sliding reference mark; and FIGS. 11 and 12 illustrate an alternative sliding reference.

DETAILED DESCRIPTION

Figure 1:
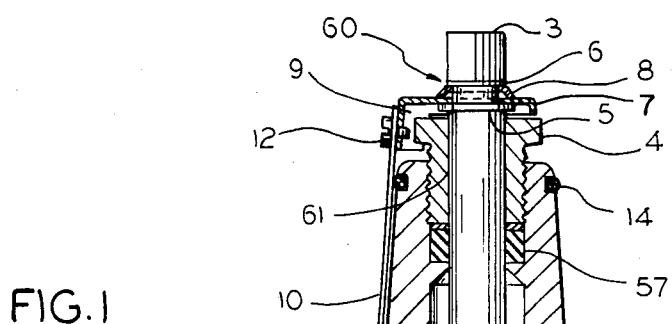
FIG. 1 illustrates in cross section a valve in accordance with the invention.
Figure 2:
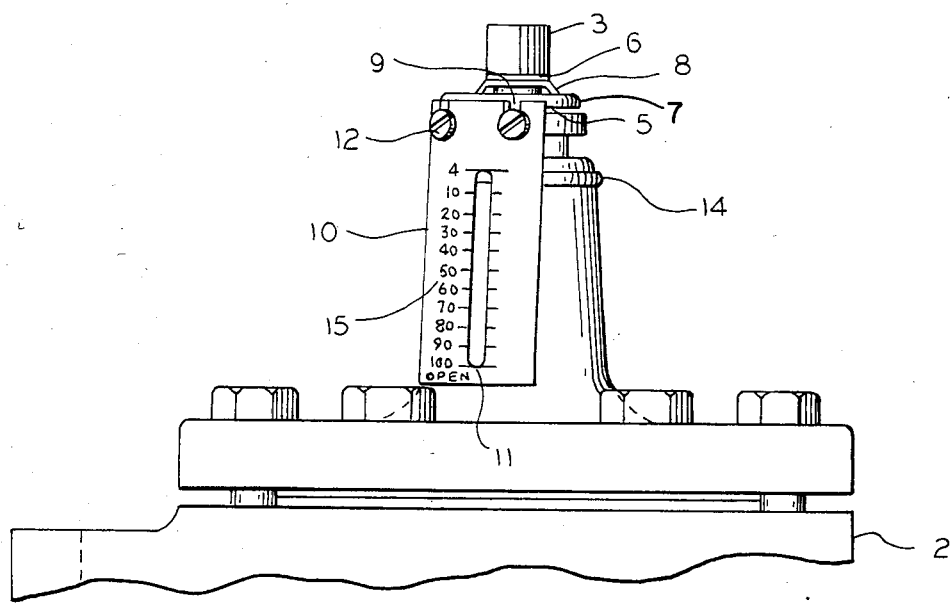
FIG. 2 is a side elevational view of a portion of the valve of FIG. 1.

The valve of FIG. 1, includes a bonnet 1 adapted to be mounted on a valve body 2. A valve stem 3 extends through and above the bonnet 1. A packing seal 57 surrounds the stem 3 and is retained by gland nut 4. The stem 3 includes a groove 60 having a shoulder 5 and a shoulder 6. A retainer cap 7 rides in groove 60 and movement of retainer cap 7 along the length of the stem 3 is prevented by retainer ring 8 which engages shoulder 6 and ring which engages shoulder 5. Retainer ring 8 is a spring which loads the retainer cap 7 to maintain cap 7 in position. The retainer cap 7 includes a downward extending portion 9 which carries semi-cylindrical scale plate 10. As best seen in FIG. 2, plate 10 includes a slot 11 and has scale markings 15 therein. Plate 10 is held on portion 9 by means of two holding and adjustment screws 12. The bonnet 1 inludes a groove carrying an indicator ring 14 which is viewable through slot 11.

The scale plate is calibrated by bringing the stem 3 to the fully closed position, loosening screws 12, moving plate 10 so the zero scale marking aligns with ring 14; and then tightening screws 12.

In operation as the valve is opened by turning the stem 3; stem 3 will rise carrying plate 10. Ring 14 viewed through slot 11 will indicate the degree of opening of the valve. Scale plate 10 may be rotated on the stem 3 to any position convenient for viewing. If it is desired to remove or replace the gland seal in the bonnet 1, retainer ring 8 is removed, retainer cap 7 and scale plate 10 are lifted off the stem 3 as a unit and gland nut 4 may be removed. The unit is reassembled in reverse order.

The indicator ring of FIGS. 1 and 2 may be replaced by other pointer arrangements.

In FIGS. 4, 5, 6 and 7 a pointer 20 is retained in groove 13 of bonnet 1 and projects into the slot 11. The pointer 20 includes a retainer portion 21 engaging the groove 13 and pointer portion 22 which is press fit on retainer portion 21.

Figure 3:
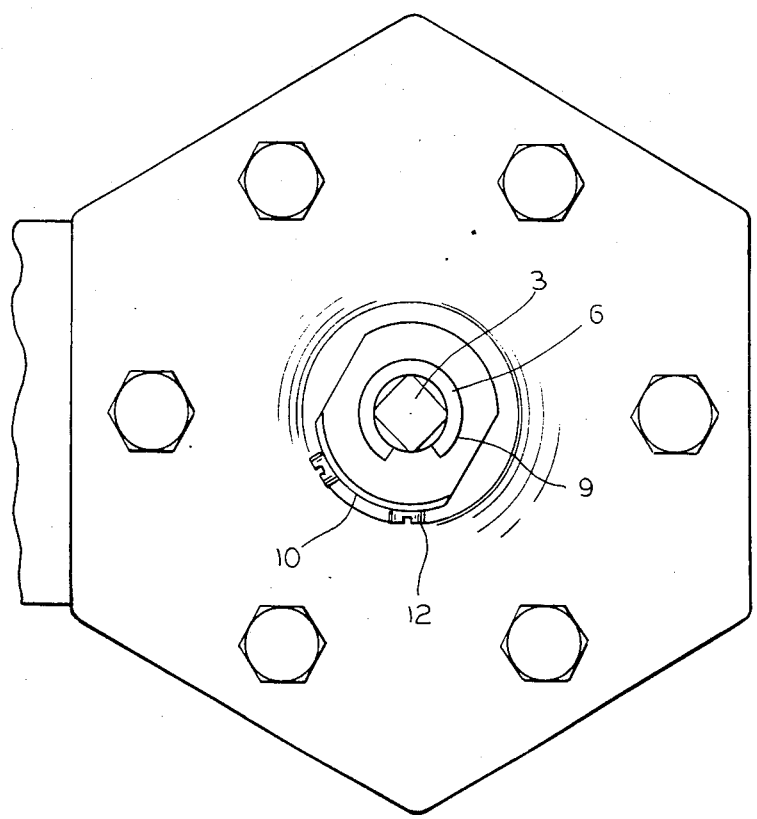
FIG. 3 is a top view of the valve portion of FIG. 2.

FIG. 8 illustrates a pointer 23 comprising a partial ring 24 which may be snapped into groove 13 of FIG. 3 in place of the pointer 20. Ring 24 carries a tab 25 which projects into slot 11 to act as a pointer.

The arrangements of FIGS. 4 through 8 bring the reference mark or pointer closer to the scale plate and thereby improve the accuracy of reading the position of the valve by eleminating or reducing parallax.

In the arrangements of FIGS. 4-8, the scale plate may still be rotated around stem 3 and the pointer 20 or 23, captured between the scale plate and the bonnet, will rotate with the scale plate.

Figure 6:
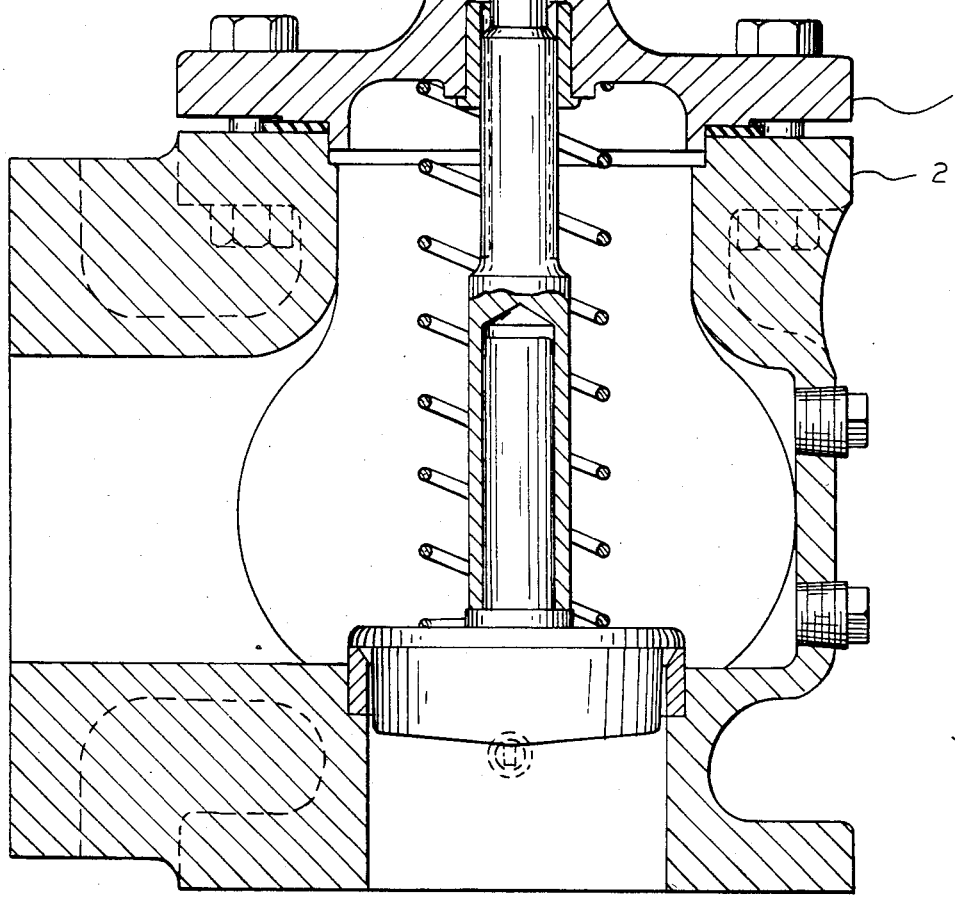
FIGS. 6 and 7 illustrate the pointer of FIG. 4.
Figure 6:
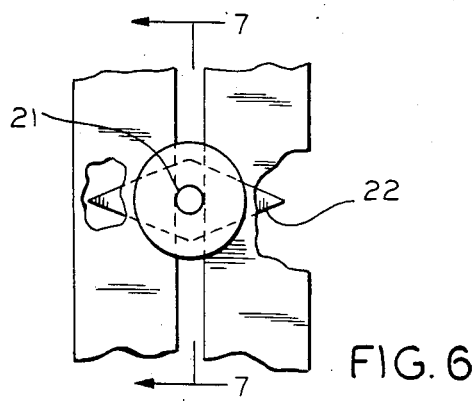
Figure 7:
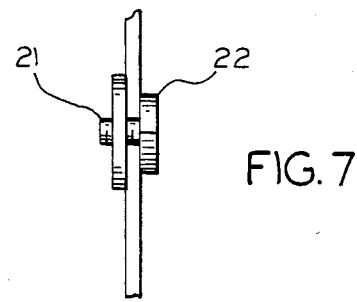

FIGS. 9, 10, 11 and 12 illustrate sliding inserts 31, 32 which may be used for example, to indicate a desired setting of the valve. Inserts 31 or 32 may be formed of metal and engage the scale plate 10 by tension. The insert 31 of FIGS. 6 and 7 is adapted to slide in slot 11, whereas the insert 32 grips the edges of scale plate 10.

What is claimed is:

1. A rising stem valve comprising:
   a bonnet;

a valve stem extending above said bonnet and having first and second shoulders;

a scale plate carried on said valve stem and movable therewith, said scale plate comprising a first portion disposed on said first shoulder and adapted to be carried on said valve stem and a second portion extending substantially parallel to said stem and adjacent said bonnet, said second portion including a slot and graduated markings adjacent said slot; and means for calibrating said scale plate;

said bonnet carrying a reference mark viewable through said slot whereby the relative position of said reference mark and said scale plate indicates the relative opening of said valve;

said valve including retaining means adapted to engage said second shoulder and said first portion to prevent movement of said scale plate relative to the longitudinal axis of said stem.

2. A valve in accordance with claim 1, wherein said second portion is separable from said first portion, said second portion and said first portion being coupled together by fastening means.

3. A valve in accordance with claims 1 or 2 wherein said bonnet includes a groove, and said reference mark comprises a pointer retained in said groove.

4. A valve in accordance with claim 3, wherein said pointer comprises a first portion adapted to engage said groove and a second portion adapted to extend into said slot.

5. A valve in accordance with claim 4, wherein said first pointing portion is a ring and said second pointing portion is a tab on said ring.

6. A valve in accordance with claim 4, wherein said pointer comprises a member adapted to engage said second pointer portion and said first pointer portion comprises a flange, said flange and said member being disposed on opposite sides of said scale plate.

7. A valve in accordance with claim 1, comprising a sliding member adapted to engage said scale plate, said sliding member gripping said scale plate and being movable thereon to indicate a desired setting of said valve.

8. A rising stem valve comprising:
a bonnet;

a valve stem extending above said bonnet said stem including first and second shoulders;

a scale plate carried on said valve stem and movable therewith, said scale plate being retained on said stem to prevent axial movement relative to said stem but being rotatable about said stem, said scale plate comprising a first portion disposed on said first shoulder adapted to be carried on said valve stem and a second portion extending substantially parallel to said stem and adjacent said bonnet, said second portion including a slot and graduated markings adjacent said slot; and means for calibrating said scale plate;

said bonnet carrying a reference mark whereby the relative position of said reference mark and said scale plate indicates the relative opening of said valve, said reference mark being viewable through said slot;

said valve including retaining means adapted to engage said second shoulder and said first portion to prevent movement of said scale plate relative to the longitudinal axis of said stem.

9. A valve in accordance with claim 8, wherein said second portion is separable from said first portion, said second portion and said first portion being coupled together by fastening means.

10. A valve in accordance with claims 8 or 9 wherein said bonnet includes a groove, and said reference mark comprises a pointer retained in said groove.

11. A valve in accordance with claim 10, wherein said pointer comprises a first portion adapted to engage said groove and a second portion adapted to extend into said slot.

12. A valve in accordance with claim 11, wherein said first pointing portion is a ring and said second pointing portion is a tab on said ring.

13. A valve in accordance with claim 11, wherein said pointer comprises a member adapted to engage said second pointer portion and said first pointer portion comprises a flange, said flange and said member being disposed on opposite sides of said scale plate.

14. A valve in accordance with claim 8, comprising a sliding member adapted to engage said scale plate, said sliding member gripping said scale plate and being movable thereon to indicate a desired setting of said valve.

* * * * *